United States Patent
Desjardins et al.

(10) Patent No.: US 10,804,546 B2
(45) Date of Patent: Oct. 13, 2020

(54) ION EXCHANGE FILTER ASSEMBLY WITH INTEGRATED DEGAS FUNCTION

(71) Applicant: MANN+HUMMEL GMBH, Ludwigsburg (DE)

(72) Inventors: Michael Desjardins, Willow Springs, NC (US); Stuart Miller, Clayton, NC (US)

(73) Assignee: MANN+ HUMMEL GmbH, Ludwigsburg (DE)

( * ) Notice: Subject to any disclaimer, the term of this patent is extended or adjusted under 35 U.S.C. 154(b) by 365 days.

(21) Appl. No.: 14/250,038

(22) Filed: Apr. 10, 2014

(65) Prior Publication Data

US 2015/0295254 A1  Oct. 15, 2015

(51) Int. Cl.
| | |
|---|---|
| *H01M 8/04* | (2016.01) |
| *H01M 8/02* | (2016.01) |
| *B01J 47/00* | (2017.01) |
| *H01M 8/04044* | (2016.01) |

(52) U.S. Cl.
CPC ......... *H01M 8/04044* (2013.01); *B01J 47/00* (2013.01); *H01M 2250/20* (2013.01); *Y02T 90/40* (2013.01)

(58) Field of Classification Search
CPC .... H01M 8/02; H01M 8/0293; B01D 35/143; B01D 35/147; B01D 35/1475; B01D 36/001; B01D 29/114
See application file for complete search history.

(56) References Cited

U.S. PATENT DOCUMENTS

| | | | |
|---|---|---|---|
| 3,180,825 A | 4/1965 | Couvreur et al. | |
| 5,599,638 A | 2/1997 | Surampudi et al. | |
| 6,503,390 B1* | 1/2003 | Gannon | B01D 17/005 210/164 |
| 6,540,909 B2* | 4/2003 | Smith | B01D 29/114 210/130 |
| 2005/0115883 A1* | 6/2005 | Takemoto | B01J 47/024 210/282 |
| 2007/0221554 A1* | 9/2007 | Wright | B01D 35/1475 210/120 |
| 2008/0078715 A1* | 4/2008 | Reid | B01D 27/02 210/266 |

FOREIGN PATENT DOCUMENTS

CN    103239907 A    8/2013

* cited by examiner

*Primary Examiner* — Kenneth J Douyette

(57) ABSTRACT

An ion exchange filter assembly includes an ion exchange filter cartridge and a housing. The ion exchange filter cartridge includes an ion exchange filter for filtering a coolant. The housing includes a first section receiving the ion exchange filter cartridge and a second section for degassing the coolant. The first section is in fluid communication with the second section.

8 Claims, 5 Drawing Sheets

ION EXCHANGE FILTER ASSEMBLY WITH INTEGRATED DEGAS FUNCTION

FIELD

The present disclosure relates to ion exchange filter assemblies. More particularly, the present teachings relate to an ion exchange filter assembly with integrated degas function.

BACKGROUND

This section provides background information related to the present disclosure which is not necessarily prior art.

Ion exchange filter assemblies may be included in cooling systems to remove ions from coolant and prevent a short circuit in the system. External bypass loops and filters may be included in the systems to limit pressure drop across the ion exchange filter assembly and to remove particulate matter from the system.

One ion exchange filter assembly is shown and described in commonly assigned U.S. Ser. No. 13/684,204 filed 22 Nov. 2012. This ion exchange filter assembly includes a housing adapted for receiving a coolant, an ion exchange filter containment region defined within the housing and adapted for housing an ion exchange filter and a coolant bypass passage defined within the housing. The ion exchange filter containment region may form a first coolant flow path within the housing and the coolant bypass passage may form a second coolant flow path in a parallel flow arrangement to the first coolant flow path.

While known ion exchange filter assemblies may have proven to be acceptable for their intended uses, continuous improvement in the pertinent art is desired.

SUMMARY

This section provides a general summary of the disclosure, and is not a comprehensive disclosure of its full scope or all of its features.

According to one particular application, the present teachings provide an ion exchange filter assembly including an ion exchange filter cartridge and a housing. The ion exchange filter cartridge includes an ion exchange filter for filtering a coolant. The housing includes a first section receiving the ion exchange filter cartridge and a second section for degassing the coolant. The first section is in fluid communication with the second section.

According to another particular application, the present teachings provide an ion exchange filter assembly including an ion exchange filter cartridge and a housing. The ion exchange filter cartridge includes an ion exchange filter for filtering a coolant. The housing includes a first section receiving the ion exchange filter cartridge and a second section for degassing the coolant. The first section is in fluid communication with the second section. The housing includes a common, internal wall between the first section and the second section. The common wall defining a coolant exit opening for routing a portion of the coolant from the first section to the second section for degassing and a coolant return opening for returning the portion of the coolant to the first section after degassing.

According to yet another particular application, the present teachings provide a vehicle fuel cell system including anode and cathode plates, a closed loop coolant path passing between the anode and cathode plates, and an ion exchange filter assembly in the closed loop coolant path. The ion exchange filter assembly includes an ion exchange filter cartridge and a housing. The ion exchange filter cartridge has an ion exchange filter for filtering the coolant. The housing including a first section receiving the ion exchange filter cartridge and a second section for degassing the coolant. The first section is in fluid communication with the second section.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION OF VARIOUS ASPECTS

Figure 1:
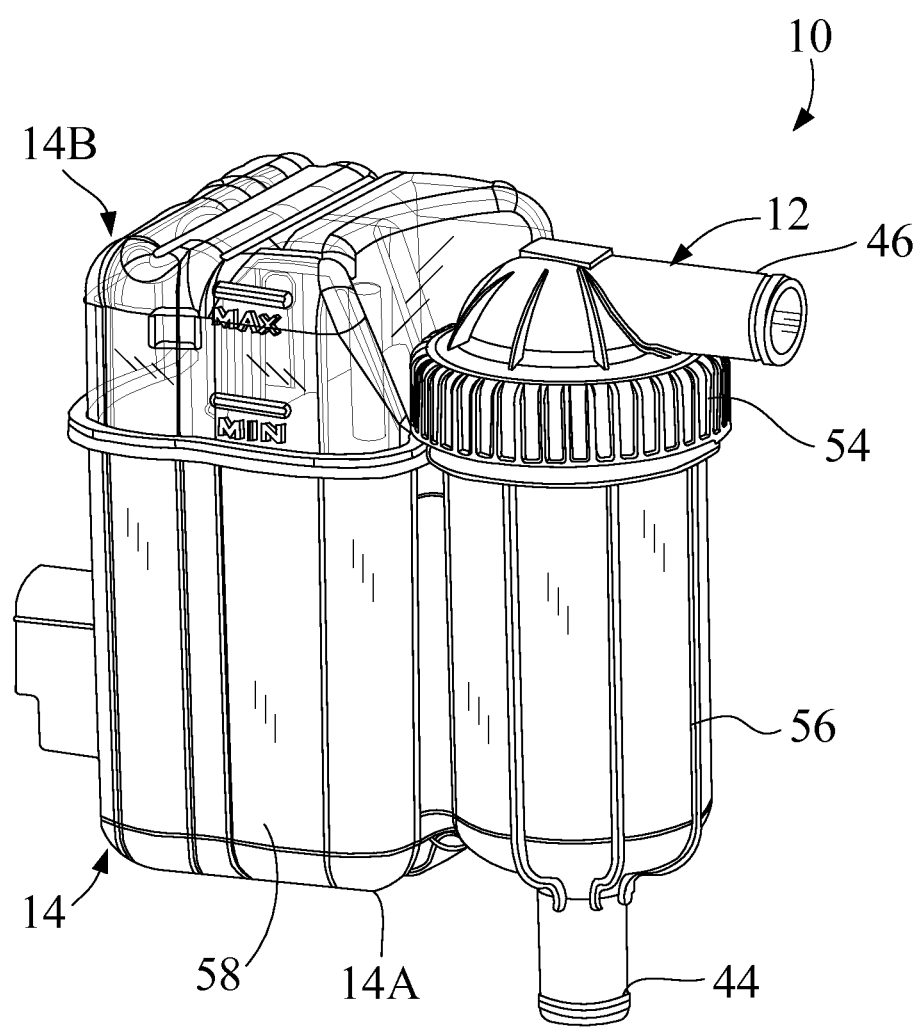
FIG. 1 is a perspective view of an ion exchange filter assembly according to the present teachings, the filter assembly illustrated to include an integrated degas function.
Figure 2:
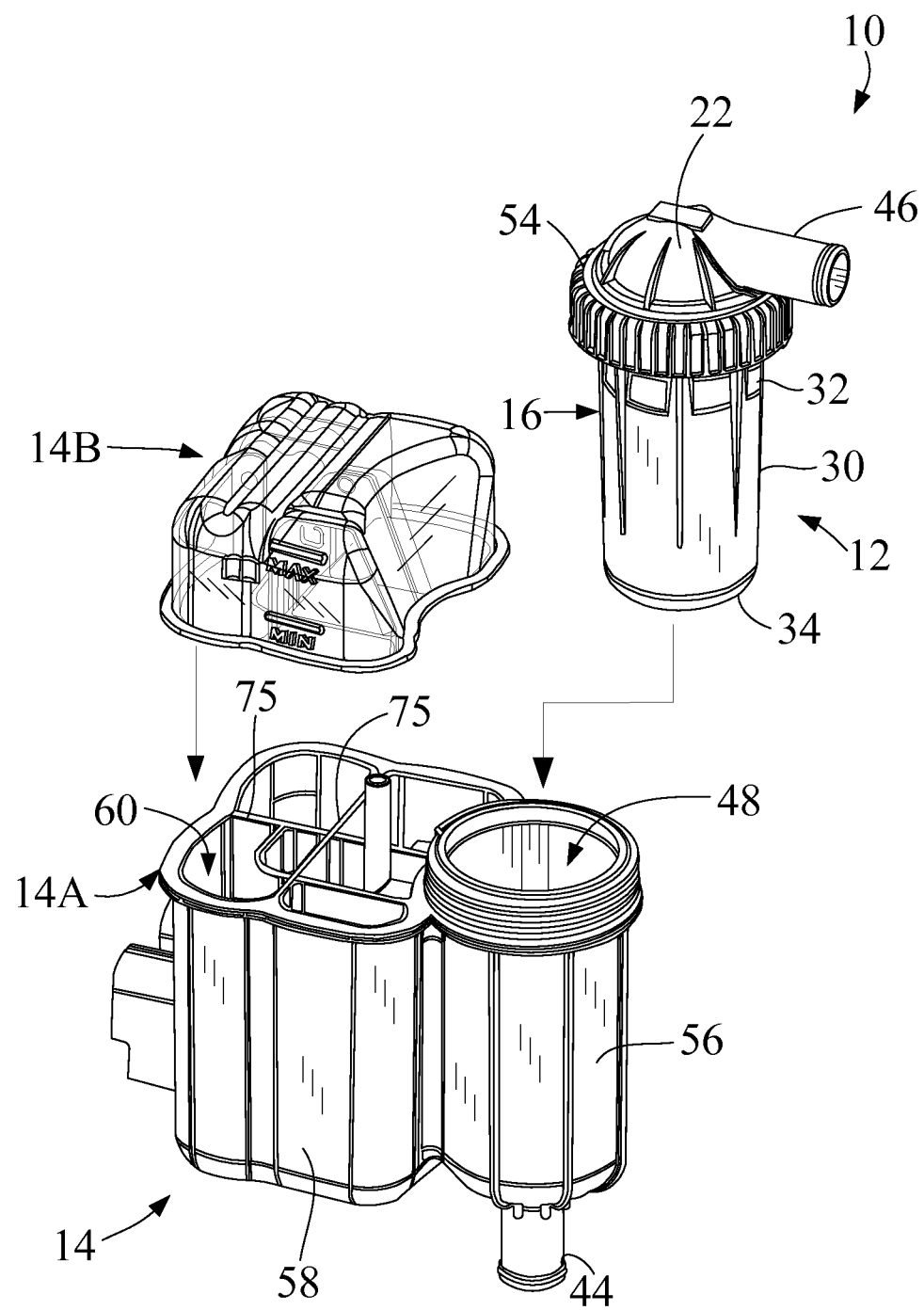
FIG. 2 is an exploded perspective view of the ion exchange filter assembly of the present teachings.
Figure 3:
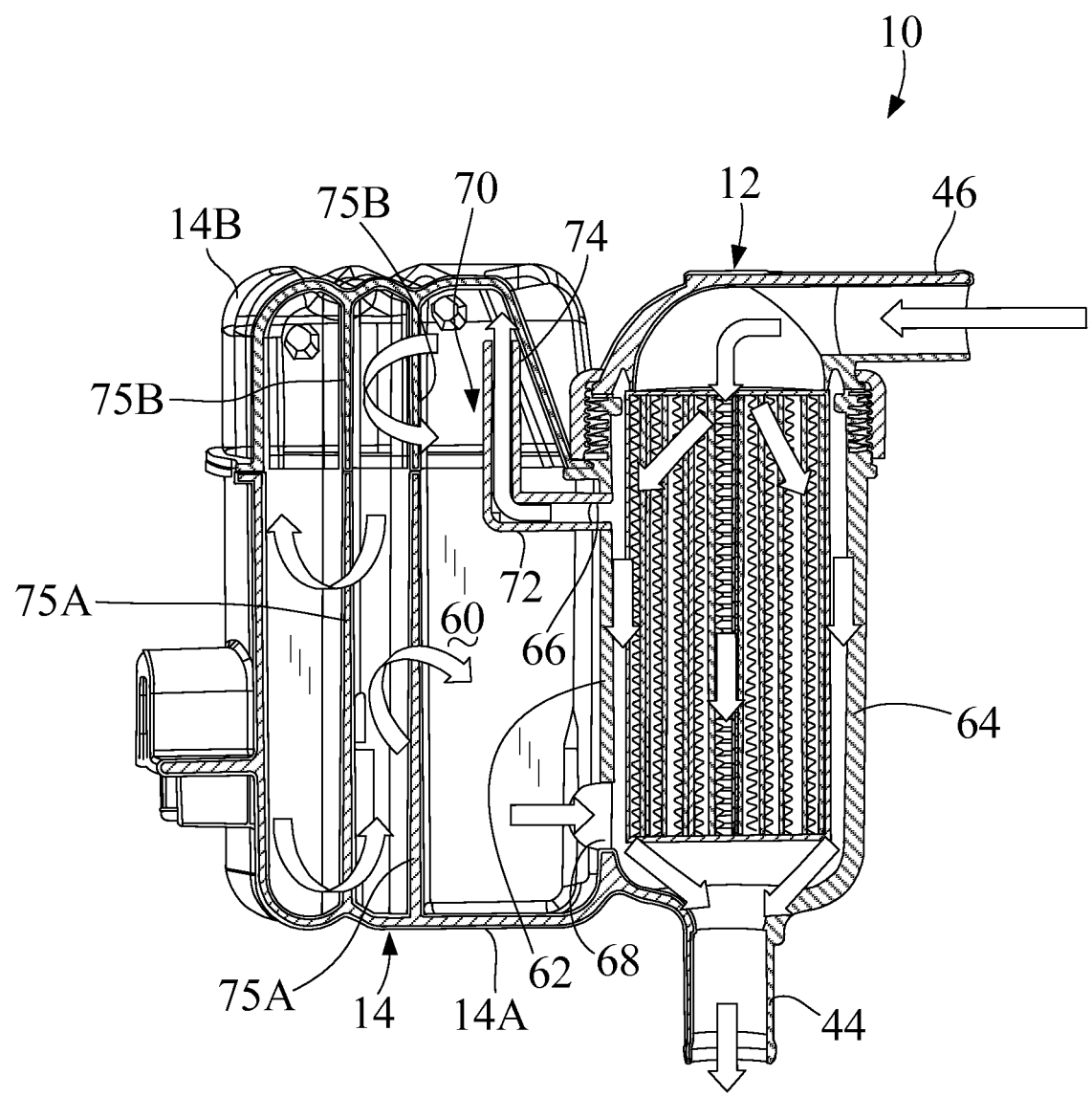
FIG. 3 is a cross-sectional view of the ion exchange filter assembly of the present teachings.

Example embodiments will now be described more fully with reference to the accompanying drawings.

With initial reference to FIGS. 1-4, an ion exchange filter assembly 10 constructed in accordance with the present teachings is illustrated and generally identified at reference chamber 10. As will be appreciated below, the ion exchange filter assembly 10 may include an integrated degas function. As illustrated in the drawings, the ion exchange filter assembly 10 may generally include an ion exchange filter cartridge 12 and a housing 14. As will be addressed further below, the housing 14 may include a first portion 14A and a second portion 14B.

The ion exchange filter cartridge 12 may include a containment tube assembly 16 and an ion exchange filter 18 secured within the containment tube assembly 16. The containment tube assembly 16 may include a containment tube 20, an end cap 22, a seal 24, particle separation filters 26 and screens 28. The ion exchange filter cartridge 12 may be formed from a variety of polymers having a low total organic content (TOC) release during operation to maintain coolant conductivity within a desired range. The containment tube 20 may define an annular wall 30 having first and second longitudinal ends 32, 34. The first longitudinal end 32 may define an opening 36 that receives the ion exchange filter 18 and the second longitudinal end 34 may define an outlet opening 38 of the ion exchange filter cartridge 12.

Coolant bypass inlets 40 may be defined radially through the annular wall 30 and may form part of a coolant bypass passage 42.

The particle separation filters 26 may be located within the housing 14 and may be in fluid communication with the coolant flow at a location upstream of a coolant outlet 44 of the housing 14. In the present non-limiting example, the particle separation filters 26 are fixed to the ion exchange filter cartridge 12 with a particle separation filter 26 located at the outlet opening 38 and at the coolant bypass inlets 40. More specifically, the particle separation filters 26 may be integral to the containment tube 20 via an overmolding process. While described as being part of the ion exchange filter cartridge 12, it is understood that the present disclosure is not limited to such arrangements. Instead, one or more of the particle separation filters 26 may be located within the housing 14 external to the ion exchange filter cartridge 12.

The end cap 22 may be fixed to the first longitudinal end 32 and may define a coolant inlet 46 for the ion exchange filter assembly 10. The coolant inlet 46 may be in communication with an ion exchange filter containment region 48 of the housing 14 and may also be in communication with the coolant bypass passage 42 via the coolant bypass inlets 40. The end cap 22 may be fixed to the containment tube 20 in a variety of ways including, but not limited to, welding.

The assembly 10 may further include a fastening mechanism 54. The fastening mechanism 54 may be engaged with the housing 14, the end cap 22 and the seal 24 to define a sealed coolant flow path from the coolant inlet 46 to the coolant outlet 44. More specifically, the fastening mechanism 54 may be in the form of a retaining ring threadably engaged with the housing 14.

Figure 4:
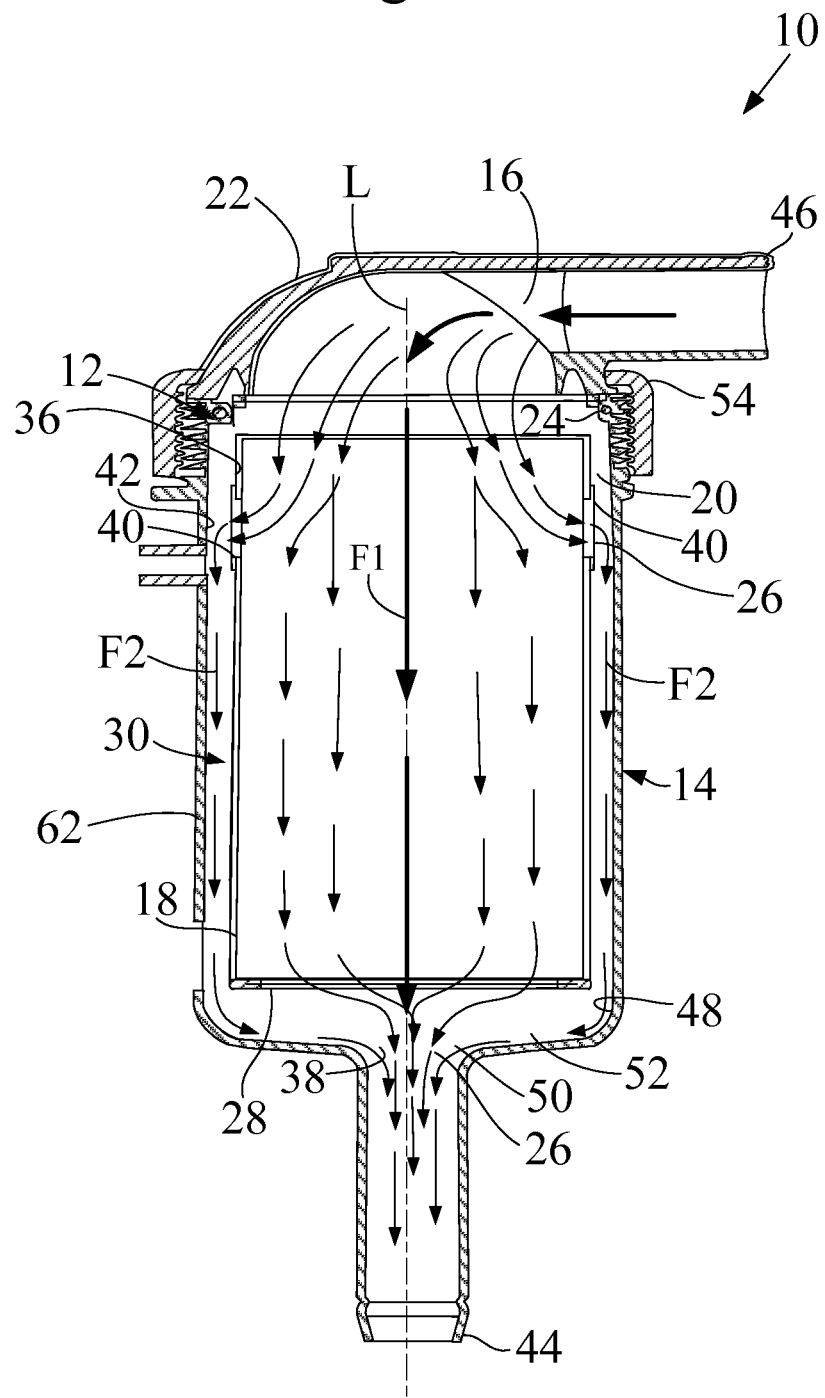
FIG. 4 is an enlarged cross-sectional view further illustrating a portion of the ion exchange filter assembly of the present teachings, the ion exchange filter of the assembly shown schematically.

As perspectively shown in FIG. 4, the ion exchange filter assembly 10 may define a first coolant flow path (F1) within the housing 14 through the ion exchange filter containment region 48, and more specifically through the ion exchange filter 18. The ion exchange filter assembly 10 may further define a second coolant flow path (F2) within the housing 14 through the coolant bypass passage 42 and parallel to the first coolant flow path (F1). The second coolant flow path (F2) may circumferentially surround the ion exchange filter 18. The first and second coolant flow paths (F1, F2) may each extend from the coolant inlet 46 to the coolant outlet 44.

The annular wall 30 may extend longitudinally between the coolant inlet 46 and the coolant outlet 44 to separate the first and second coolant flow paths (F1, F2). The first coolant flow path (F1) may define a first inlet in communication with a second inlet defined by the second coolant flow path (F2) at the coolant inlet 46. The first coolant flow path (F1) may define a first outlet in communication with a second outlet defined by the second coolant flow path (F2) at the coolant outlet 44. The second coolant flow path (F2) may surround the first coolant flow path (F1) and may be concentric to the first coolant flow path (F1). The coolant bypass inlets 40 may define a passive flow control mechanism that meters coolant flow through the first and second coolant flow paths (F1, F2).

In the present non-limiting example, the ion exchange filter cartridge 12 is located within the ion exchange filter containment region 48 and cooperates with the housing 14 to define the coolant bypass passage 42. More specifically, the annular wall 30 separates and at least partially defines the ion exchange filter containment region 48 and the coolant bypass passage 42. While the ion exchange filter containment region 48 and the coolant bypass passage 42 are described as being at least partially defined by the ion exchange filter cartridge 12, it is understood that the present disclosure is not limited to such arrangements. A variety of alternate arrangements are within the scope of the present disclosure including, but not limited to, the annular wall 30 being part of the housing 14. The coolant bypass passage 42 may be defined at a location radially between an exterior of the annular wall 30 and an interior of the housing 14.

The first and second outlets defined by the first and second coolant flow paths (F1, F2) may be proximate one another. The second coolant flow path (F2) may generate a localized low pressure region in the coolant flow as the coolant from the second flow path (F2) flows past the first outlet. In the present non-limiting example, the outlet opening 38 of containment tube 20 may include an annular protrusion 50 extending longitudinally outward from a base region 52 of the containment tube 20. The bypass coolant flow passes the annular protrusion 50 and creates a localized low pressure region at the outlet opening 38 of the ion exchange filter cartridge 12 to assist in drawing coolant through the ion exchange filter 18.

The ion exchange filter 18 is further described in commonly assigned U.S. Ser. No. 13/684,204, filed 22 Nov. 2012. U.S. Ser. No. 13/684,204 is incorporated by reference as if fully set forth herein.

The first portion 14A of the housing 14 is illustrated to include a first section 56 and a second section 58. The first section 56 defines the filter containment region 48 and includes the coolant outlet 44. The second section 58 at least partially defines a chamber 60 for degassing the coolant. In the embodiment illustrated, the first portion 14A of the housing 14 may be integrally formed to include the first and second sections 56 and 58. The first portion 14A may be injection molded of a suitable plastic material to monolithically include the first and second sections 56 and 58.

In the embodiment illustrated, the second portion 14B of the housing 14 may cooperate with the second section 58 of the first portion 14A to define the degassing chamber 60. The second portion 14B may be injection molded of a suitable plastic material or otherwise formed of known materials. The second portion 14B may be releasably attached to the first portion 14A in any manner well known to those skilled in the art. For example, the second portion 14B may be snap fit to the first portion 14A. A suitable seal may be provided between the first and second portions 14A and 14B to establish a fluid tight relationship therebetween.

In the embodiment illustrated, it will be understood that the second portion 14B may be formed of a translucent plastic. In this manner a level of coolant within the degassing chamber 60 may be visually inspected without removing the second portion 14B. The second portion 14B may be provided with level indicators (e.g., "MIN" and "MAX"). Such level indicators may be integrally molded into the second portion 14B. Within the scope of the present teachings, it will be understood that the second portion 14B may alternatively be formed of an opaque material.

The first and second sections 56 and 58 of the first housing portion 14A may share a common wall 62. In the embodiment illustrated, this common wall 62 may have a partial cylindrical shape. The common wall 62 may cooperate with an exterior side wall 64 of the first section 56 to define the cylindrical filter containment region 48 of the housing.

The common wall 60 may define a coolant exit opening 66 and a coolant return opening 68. The coolant exit and return openings 66 and 68 provide fluid communication between the filter containment region 48 and the degassing chamber 60. The coolant exit opening 66 may be associated with a port or conduit 70. The conduit 70 may be integrally formed with the common wall 62 and the remainder of the first portion 14A of the housing 14.

The conduit 70 may be generally L-shaped with a first arm 72 horizontally extending from the common wall 62 and a second arm 74 vertically extending from the first arm 72. The second arm 74 may upwardly extend from the first portion 14A of the housing 14 into the second portion 14B of the housing 14.

In operation, coolant enters the ion exchange filter assembly 10 at the coolant inlet 46. A first portion of the coolant proceeds down the first coolant flow path (F1). A second portion of the coolant proceeds down the second coolant flow path (F2). A sub-portion of the fluid proceeding down the second coolant flow path (F2) is forced through the coolant exit 66 and into the conduit 70. Under sufficient pressure, the coolant is forced up the second arm 74 of the conduit and into a top of the degassing chamber 60.

The first and second portions 14A and 14B cooperate to divide the degassing chamber 60 into a plurality of sub-chambers. The sub-chambers are defined by a plurality of internal walls 75 cooperatively created by both the first and second portions 14A and 14B. As illustrated, a lower portion 75A of the walls 75 is created by the first portion 14A and cooperating upper portions 75B are created by the second portion 14B.

The coolant degasses as it proceeds through the degassing chamber 60. It will be understood that walls created by the lower and upper portions 75A and 75B may be substantively corresponding walls of conventional degas bottles. Explaining further, the coolant enters the degas bottle 74 and slowly proceeds through each chamber, passing from chamber to chamber through small windows in the wall between each chamber until it reaches the last chamber. The "window" or hole location may be generally positioned closer to the bottom of the separating partition wall, but may (in some cases) be alternately positioned such that a chamber inlet is positioned at one end (e.g., near the bottom or top) and a chamber outlet at the opposite end. The degassed coolant from the degassing chamber 60 returns to the filter containment region of the housing through the coolant return opening 68. The degassed coolant from the degassing chamber 60 joins the remaining coolant and is routed out of the ion exchange filter assembly 10 through the coolant outlet 44.

Figure 5:
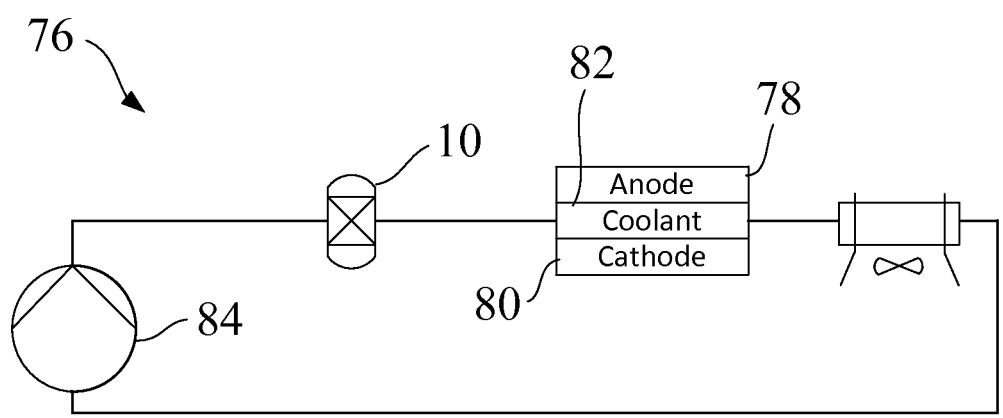
FIG. 5 is a schematic illustration of a vehicle fuel cell system including the ion exchange filter assembly from FIG. 1.

The ion exchange filter assembly 10 may be used in a variety of systems including, but not limited to, vehicle fuel cell cooling systems and cooling systems for electronic components such as electronic circuits. FIG. 5 illustrates the ion exchange filter assembly 10 incorporated into a vehicle fuel cell system 76. The vehicle fuel cell system 76 may include anode and cathode plates 78, 80 and a closed loop coolant path 82 passing between the anode and cathode plates 78, 80. A coolant pump 84 may pump coolant through the coolant path 82 and through the ion exchange filter assembly 10.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An ion exchange filter assembly comprising:
    an ion exchange filter cartridge including an ion exchange filter for filtering a coolant;
    a housing including a first section receiving the ion exchange filter cartridge and a second section for degassing the coolant, the first section being in fluid communication with the second section, the housing including a common, internal wall between the first section and the second section, the common wall defining a coolant exit opening for routing a portion of the coolant from the first section to the second section for degassing and a coolant return opening for returning the portion of the coolant to the first section after degassing.

2. The ion exchange filter assembly of claim 1, wherein the common, internal wall is partially cylindrical in shape.

3. The ion exchange filter assembly of claim 2, wherein the common, internal wall cooperates with an exterior sidewall of the first section to define a cylindrical filter containment region receiving the filter.

4. The ion exchange filter assembly of claim 1, further comprising a conduit associated with the coolant exit opening, the conduit having an open end disposed above the coolant exit opening.

5. The ion exchange filter assembly of claim 1, wherein the housing includes a first portion including the first and second sections and a second portion removably secured to the first portion, the first and second portions cooperatively defining a degassing chamber.

6. The ion exchange filter assembly of claim 4, wherein the housing includes a first portion including the first and second sections and a second portion removably secured to the first portion, the first and second portions cooperatively defining the degassing chamber; and
    wherein the conduit upwardly extends into the second portion of the housing.

7. The ion exchange filter assembly of claim 6, wherein the conduit is generally L-shaped with a first arm horizontally extending from the common, internal wall and a second arm upwardly extending from the first arm.

8. The ion exchange filter assembly of claim 1, wherein the ion exchange filter assembly is configured to operate with a vehicle fuel cell system.

* * * * *